Sept. 2, 1952     A. GREENBAUM     2,609,046
TRIMMING MACHINE

Filed April 17, 1946     5 Sheets-Sheet 2

INVENTOR.
ARTHUR GREENBAUM
BY Jenney & Hildreth
ATTORNEYS

Sept. 2, 1952 A. GREENBAUM 2,609,046
TRIMMING MACHINE
Filed April 17, 1946 5 Sheets-Sheet 3

INVENTOR.
ARTHUR GREENBAUM
BY *Jenney & Hildreth*
ATTORNEYS

Sept. 2, 1952  A. GREENBAUM  2,609,046
TRIMMING MACHINE
Filed April 17, 1946  5 Sheets-Sheet 4

INVENTOR.
ARTHUR GREENBAUM
BY Jenney & Hildreth
ATTORNEYS

Sept. 2, 1952     A. GREENBAUM     2,609,046
TRIMMING MACHINE

Filed April 17, 1946     5 Sheets-Sheet 5

INVENTOR.
ARTHUR GREENBAUM
BY Jenney & Hildreth
ATTORNEYS

Patented Sept. 2, 1952

2,609,046

UNITED STATES PATENT OFFICE 2,609,046

TRIMMING MACHINE

Arthur Greenbaum, Revere, Mass., assignor to American Biltrite Rubber Co. Inc., Stoughton, Mass., a corporation of Massachusetts Application April 17, 1946, Serial No. 662,896

6 Claims. (Cl. 164—20)

The present invention relates to trimming machines for rubber articles and more particularly for machines for trimming shoe bottoms such as heels and soles.

In the manufacture of molded rubber articles such as rubber heels, the projecting marginal fin which is left as a consequence of the molding operation is usually removed by manually presenting the heel to a revolving knife. This operation frequently results in a non-uniform product, it requires skilled labor and is expensive.

The object of the present invention is to provide an automatic machine for removing the projecting fin in a precise manner and with greater economy than under existing methods.

With this object in view the principal feature of the invention comprises a separable die in which the heel blank is received, the die having upwardly projecting edges to cut off the fin when the die is presented to rollers. An important feature of construction is the manner in which the die is split. Thus, the die is split asymmetrically, and in general, substantially along the greatest dimension of the article. In the case of a heel, the split preferably extends diagonally from one corner across the heel. The purpose of this feature is to avoid the necessity of accurately placing the article in the die by hand.

Other features of the invention comprise a safety mechanism to prevent injury if the heel is not properly seated in the die, an automatic lubricating device to facilitate positioning of the heel within the die; and a brush for cleaning the severed fin from the heel. Still further features comprise certain novel features of construction and arrangement which are hereinafter described and particularly defined in the claims.

Figure 1:
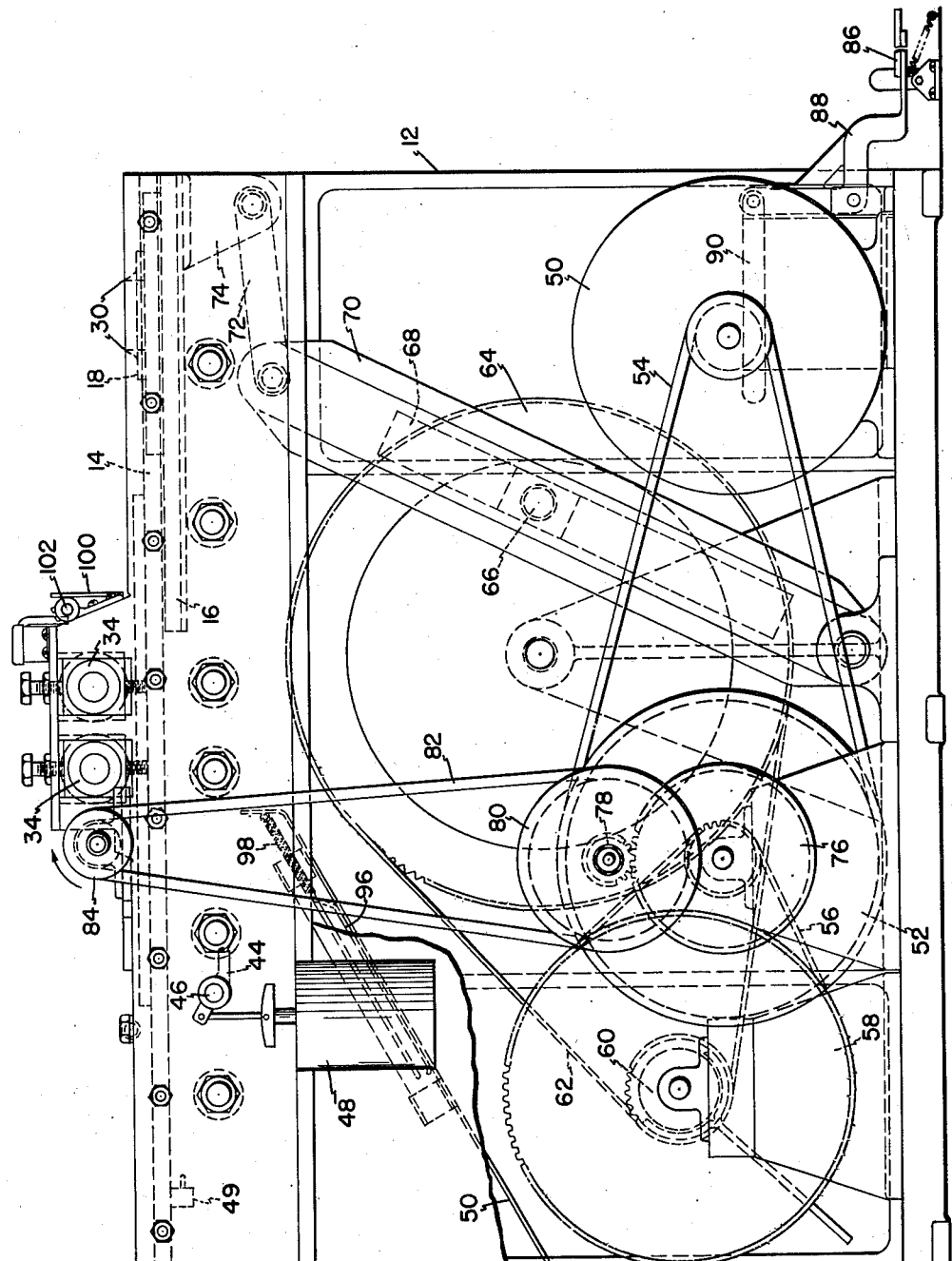
Figure 2:
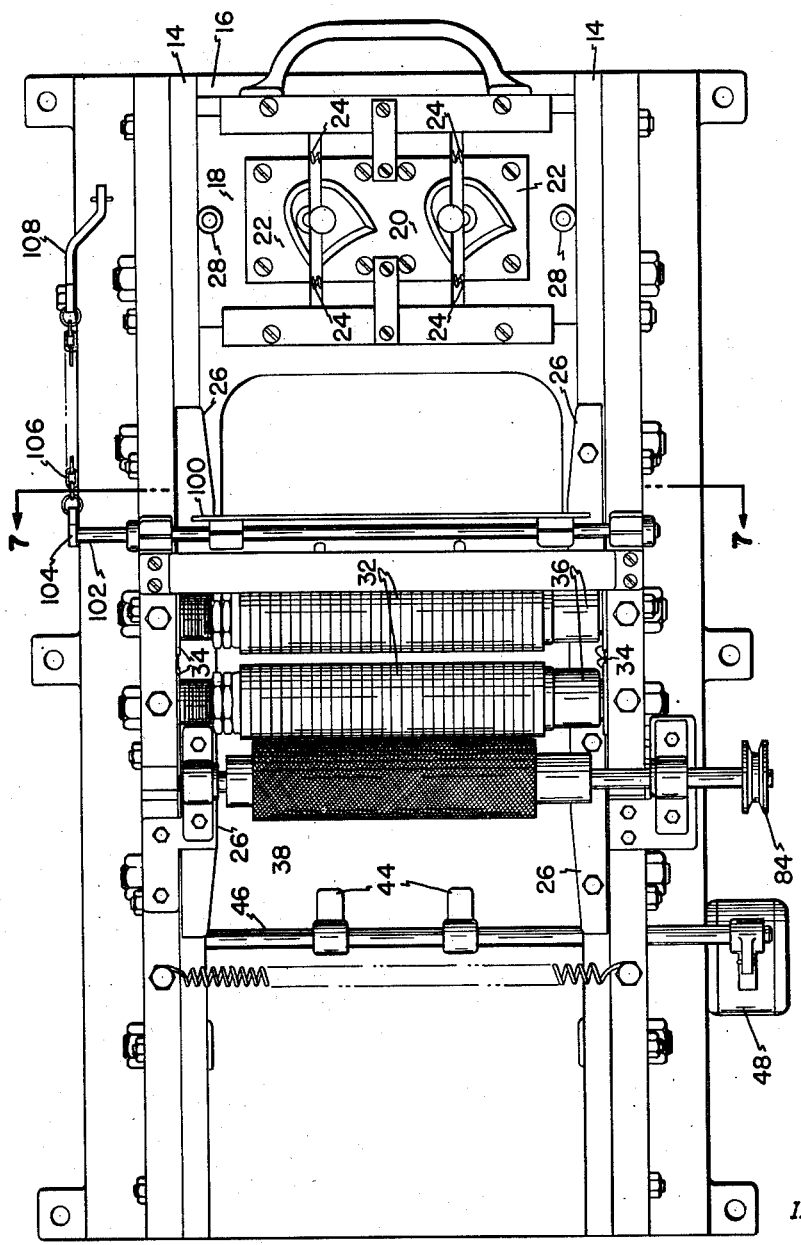
Figure 3:
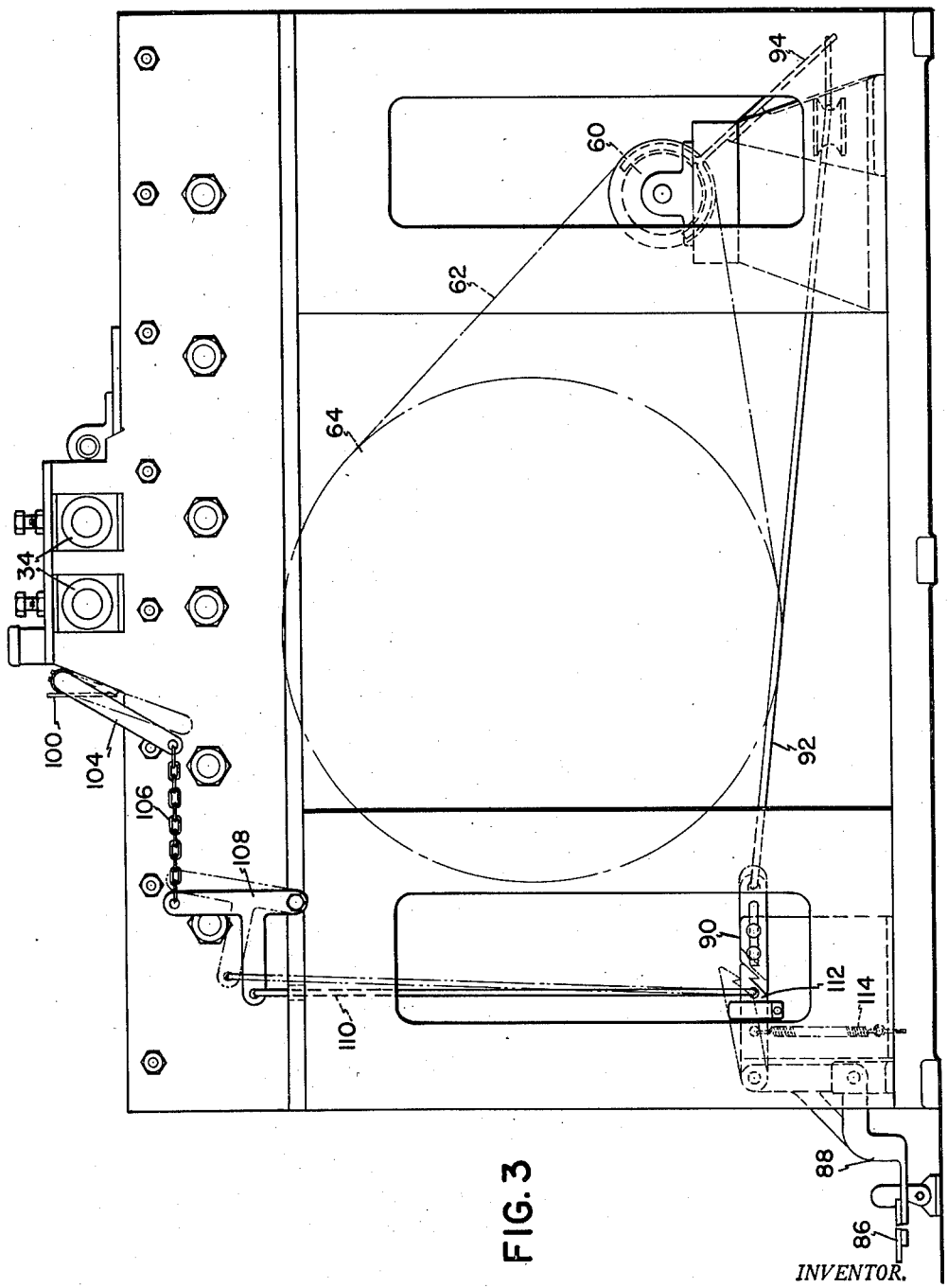
Figure 5:
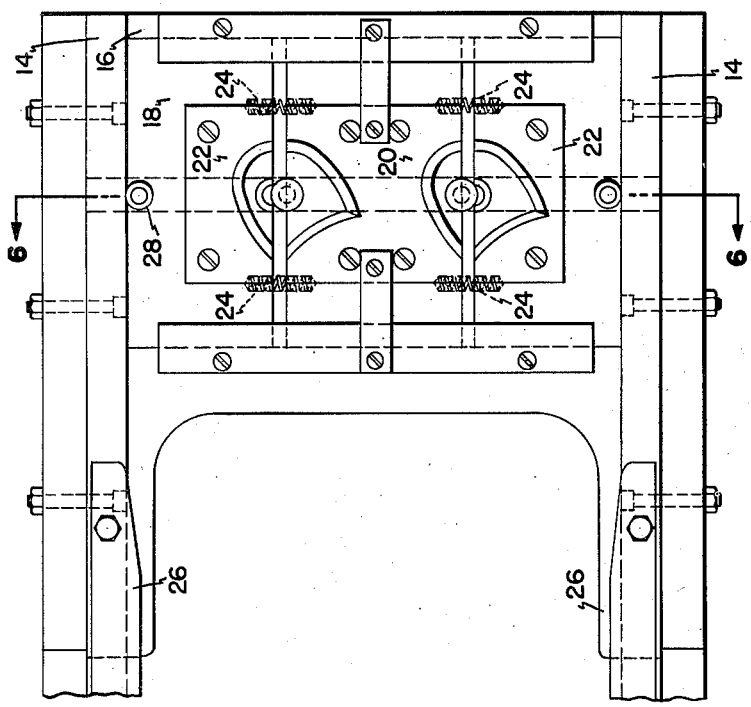
Figure 4:
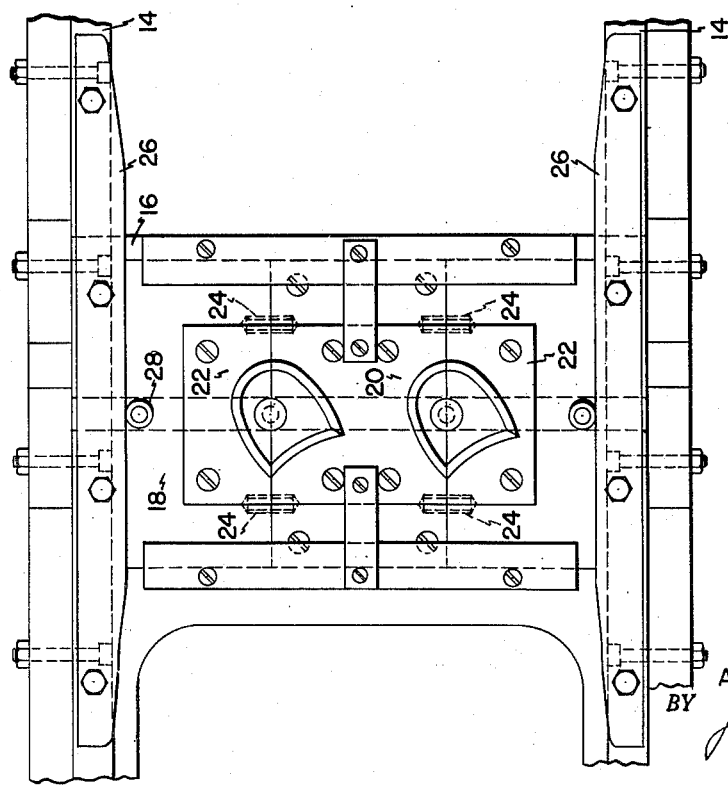
Figure 6:
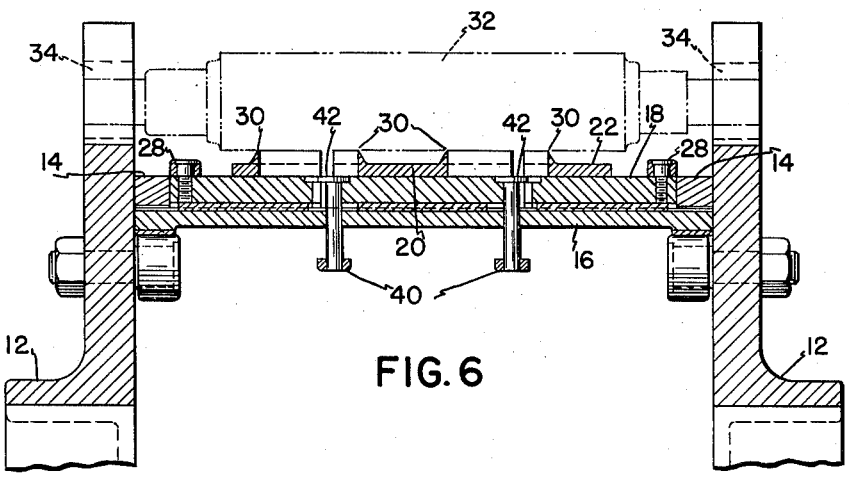
Figure 7:
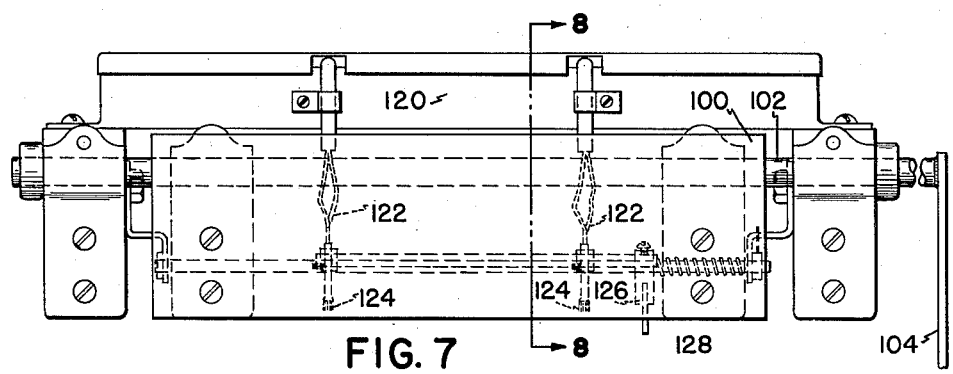
Figure 10:
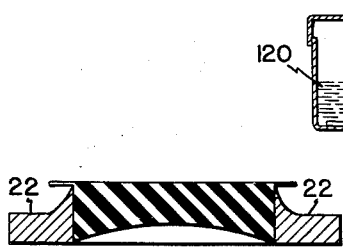
Figures 8, 9:
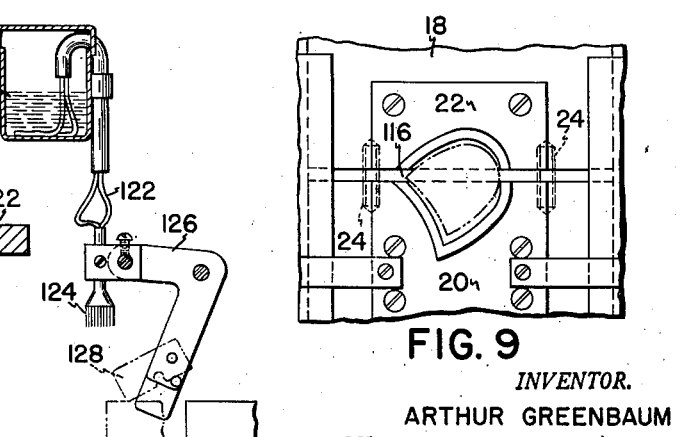

In the accompanying drawings Fig. 1 is an elevation of the left side of preferred form of machine for trimming rubber heels; Fig. 2 is a plan view; Fig. 3 is an elevation of the right side; Figs. 4 and 5 are details illustrating the operation of the dies; Fig. 6 is a detail sectional elevation showing the mechanism for cutting the fin from the heel; Figs. 7 and 8 are details of the lubricating mechanism; and Fig. 9 is a diagram illustrating the manner of locating a heel in the die and Fig. 10 is a detail showing the severance of the fin from the heel.

The illustrated embodiment of the invention comprises a frame 12 having guides 14 within which slides a reciprocating carriage 16 carrying the separable die members 18. As shown in Fig. 2 the carriage is provided with two dies whereby a pair of heels may be trimmed simultaneously. Each die comprises a stationary portion 20 mounted on the carriage and a laterally movable portion 22 normally held apart from the stationary portion by means of springs 24. As shown in Figs. 2, 4 and 5 the split between the portions 18 and 20 of each die extends longitudinally of the machine but the dies are placed at an angle so that the split is generally diagonal of the die. In Figs. 2 and 5 the dies are shown open for reception of untrimmed heels. Fig. 4 illustrates the position of the die during an intermediate portion of their reciprocation, when the dies are closed by means of cams 26 engaging rollers 28 on the sliding portions 22 of the die.

In operation a heel blank is placed in each die with the fin extending above the edges. As shown in Figs. 6 and 10, the outer edges of the dies are extended upwardly to form cutting edges 30. When the dies are closed by the cams 26 the fins are severed from the blanks by means of rollers 32.

As shown in Figs. 1 and 6 the rollers are journaled in accurately placed pillow blocks 34, whereby the rollers are caused to ride over the cutting edges 30, with the proper pressure to sever the fin from the heel. As shown in Fig. 2 each roller is made of fibre and is preferably fabricated by stacking a series of fibre disks on a central rod 36. The rollers 32 are not positively driven but simply rolled over the edges of the dies as the latter pass beneath the rolls.

Beyond the rolls is a rotating brush 38 which is positively driven in the direction indicated in Fig. 1, namely in such a direction that the rotation will separate the severed fin from the heel blank and throw it rearwardly, that is toward the left in Fig. 1. It will be understood that the fin may not be completely severed from the blank by the cutting operation, but there may be places where the fin is still held to the blank. The brush 38 engages portions of the fin progressively as the table is fed under the brush. Hence the brush acts to pull or stretch the fin and tear it from the blank at any points where it may remain attached to the blank.

On further passage of the carriage rearwardly, the dies open since, as indicated in Fig. 2, the closing cams 26 terminate immediately beyond the brush 38. At the end of the stroke the heels are ejected from the dies. To this end each die is provided with an ejector 40 comprising a freely sliding rod carried by each die adjacent to the line of separation of the die. As clearly indicated in Fig. 6, the ejector rod normally has its top face 42 flush with the bottom surface of the carriage so that it does not interfere with the placing of the heel in the die.

At the end of the carriage stroke the ejectors 40 are positioned immediately above fingers 44 on a rod 46 which is quickly rotated in a counter-clockwise direction by means of a solenoid 48. The solenoid is energized at the proper time by a suitable switch 49 actuated when the carriage is in the proper position. This action throws the heels upwardly and clear of the dies so that on the retracting motion of the dies, the heels will fall clear of the dies, and on a chute 50 from which they are discharged into a suitable bin. If the heels should fall back into the retreating dies they will be thrown out upon contact with the rotating brush.

The drive mechanism is shown in Fig. 1. The motor 50 drives an intermediate pulley 52 through a belt 54. The pulley 52 is connected by a belt 56 with a pulley 58 connected through a clutch 60 with a belt 62 to drive the large wheel 64. The wheel 64 is provided with an eccentric pin 66 sliding within a groove 68 of a lever 70 which is connected by a link 72 with a tail piece 74 depending from the carriage 16. Thus, rotation of the wheel 64 reciprocates the carriage 16 back and forth. The intermediate pulley 52 is mounted on the same shaft with a gear 76 driving a gear 78, rotation of which is transmitted through a pulley 80 and belt 82 to a pulley 84 on the shaft of the brush 38.

The clutch 60 is operated by a treadle 86 connected through a bell crank lever 88 and a sliding separable link 90 (to be later described) and a cable 92 with the clutch 60. The details of the clutch are not shown and it will suffice to state that upon depression of the treadle the clutch is closed to cause a driving motion of the wheel 64 and hence of the carriage.

Since the chute 50 is in the path of the upper end of the oscillating lever 70, an opening is provided in the chute and the opening is normally closed by a plate 96 being held in closed position by a spring 98 connected between the upper end of the chute and the bottom of the plate. Near the end of the motion of the lever 70 the lever engages the top of the plate and permits the latter to slide downwardly. By the time the heels are ejected and fall on the chute the lever 70 has retracted sufficiently to permit the plate 96 to close the opening.

A safety device is also provided to stop the machine if a heel is not properly located in the die and to prevent the workman from injury by catching his fingers between the dies and the rollers. The safety device comprises a plate 100 pivoted as indicated in Fig. 3 immediately in front of that part of the frame which carries the support for the roller bearings. The plate is so arranged that a heel of normal height will just pass under it. The plate is mounted on a shaft 102 having at its outer end an arm 104 which is connected by a chain 106 with a bell crank lever 108. The lever is connected by a rod 110 with a latch member 112 which forms a part of the separable link 90. Thus, if the plate 100 is engaged by a heel which is misplaced because not properly located within the die or is engaged by the workman's hand, it swings and breaks the connection 90, throwing the clutch to stop the reciprocating movement of the carriage. A spring 114 is provided to restore the link 112 to normal position. The two portions of the link will reestablish contact upon release of the treadle.

Attention has been directed to the split of the die as shown in Figs. 1, 4, 5 and 9. In Fig. 9 the outline of the die is shown and the outline of a heel is indicated in dot and dash lines. It will be observed that accurate initial positioning of the heel is not required. If the die were split on a median line, the dimension from the breast to the rear of the die would be approximately the same as the corresponding dimension of the heel and it would be necessary for the operator to fit the heel accurately into the die. By the present arrangement wherein the split extends asymmetrically from one corner and along substantially the longest dimension, the heel may be dropped in the die with regard only for its approximate location. Then upon closing of the die, the pressure of the sides against the heel, while the heel is positioned at the corner 116 will cause the heel to swing into proper ultimate relation with the die.

A feature of the invention is in the means for lubricating the die. It has been found that the rear corner 116 tends to pinch the rubber. To prevent this, a small amount of oil is placed at that corner during the retractive movement. To this end there is provided an oil reservoir 120 connected by a wick 122 with a brush 124. The brush is arranged for up and down movement by being mounted at the end of a pivoted bell crank lever 126, the bottom end of which is provided with a pivoted latch 128. Thus, on a rearward movement of the carriage as indicated by dot-and-dash lines in Fig. 8 the latch swings ineffectively out of the way. Upon a forward motion of the carriage the front of the carriage strikes the latch 128 and brings the brush down at the proper time to wipe the corners 118 of the die. This deposits a slight amount of oil at the corner, so that when the die is later closed on a heel, the heel will freely assume the correct position in the die.

Having thus described the invention, I claim:

1. A trimming machine for removing a projecting fin from a molded rubber article comprising a separable die having a peripheral cutting edge, means for closing the die, means for applying pressure to sever the fin against the cutting edge, means for feeding the die to the pressure applying means, a safety device including a pivoted member disposed immediately above the normal position of the article in advance of the feeding means, and connections operated by the safety device to stop the feeding means.

2. A trimming machine for removing a projecting fin from a molded rubber article comprising a separable die having a peripheral cutting edge, means for closing the die, means for applying pressure to sever the fin against the cutting edge, a reciprocating table for feeding the die to the pressure-applying means, a plate ahead of the pressure applying means, and pivoted in a position immediately above the normal position of the article, and connections operated by motion of the plate to stop the table.

3. A trimming machine for removing a projecting fin from a molded rubber article comprising a separable die having a peripheral cutting edge, means for closing the die, means for applying pressure to sever the fin against the cutting edge, a reciprocating table for feeding the die to the pressure-applying means, a lubricant reservoir, and means for supplying lubricant to the die on a retracting movement of the die, said means being inoperative on a feeding movement of the die.

4. A trimming machine for removing a projecting fin from a molded rubber article comprising a separable die having a peripheral cutting edge, means for closing the die, means for applying pressure to sever the fin against the cutting edge, a reciprocating table for feeding the die to the pressure-applying means, a lubricant reservoir, a wick to supply lubricant from the reservoir to the die, and a latch device operated by the table on a retracting movement thereof to bring the wick into proximity with the die, said device being inoperative on a feeding movement of the die.

5. A trimming machine for removing a projecting fin from a molded shoe heel, comprising a two part separable die having a cutting edge, means for closing the die after insertion of the heel, and means for applying pressure to sever the projecting fin of the heel against the cutting edge of the die, the line of separation of the die extending from one corner of the shoe heel at the intersection of side margin and breast, along an axis oblique to the axis of symmetry of the heel to the curved rear margin of the heel, at a point where the line of separation is substantially perpendicular to a tangent to said heel at that point.

6. A trimming machine for removing a projecting fin from a molded shoe part, the contour of which includes two corners and a curved marginal portion, said machine comprising a two part separable die having a cutting edge, means for closing the die following the insertion of a part to be trimmed, and means for applying pressure to sever the projecting fin against the cutting edge of the die, the line of separation of the die parts extending obliquely from one corner of said article to a point on the curved marginal portion most remote from said corner.

ARTHUR GREENBAUM.

REFERENCES CITED

The following references are of record in the file of this patent:

UNITED STATES PATENTS

| Number | Name | Date |
|---|---|---|
| 330,913 | Maxfield | Nov. 24, 1885 |
| 518,596 | Gibbs | Apr. 24, 1894 |
| 613,397 | Sanson | Nov. 1, 1898 |
| 1,167,967 | Campbell | Jan. 11, 1916 |
| 1,208,019 | Roney | Dec. 12, 1916 |
| 1,297,023 | Simmons | Mar. 11, 1919 |
| 1,308,479 | Campbell | July 1, 1919 |
| 1,616,752 | MacDonald | Feb. 8, 1927 |
| 1,932,571 | Blood | Oct. 31, 1933 |
| 2,101,654 | Sheehan | Dec. 7, 1947 |
| 2,121,003 | Balfe | Jan. 24, 1938 |

OTHER REFERENCES

Miller: (Reissue) 12,809, June 9, 1908.
Freeman: (Reissue) 20,203, Dec. 8, 1936.